Patented Aug. 22, 1939

2,170,746

UNITED STATES PATENT OFFICE 2,170,746

PRODUCTION OF TERTIARY ALIPHATIC AMINES

Bruno Christ, Ludwigshafen-on-the-Rhine, Germany, assignor to I. G. Farbenindustrie Aktiengesellschaft, Frankfort-on-the-Main, Germany No Drawing. Application February 19, 1938, Serial No. 191,491. In Germany March 3, 1937

7 Claims. (Cl. 260—583)

The present invention relates to improvements in the production of tertiary aliphatic amines.

In Patent No. 1,762,742 there is described a process for the production of primary aliphatic or cyclic amines according to which aliphatic or cyclic carbonyl compounds, i. e., aldehydes or ketones or their ammonia compounds are led in a vapor phase in admixture with hydrogen and an excess of gaseous ammonia at an elevated temperature over hydrogenation catalysts, alone or together with agents splitting off water.

I have now found that tertiary aliphatic amines can be obtained in good yields by leading aliphatic aldehydes having at the most 6 carbon atoms in the molecule together with secondary aliphatic amines, each alkyl group of which contains at the most 6 carbon atoms, in the vapor phase with hydrogen at an elevated temperature over hydrogenation catalysts. It is advantageous to use activated hydrogenation catalysts alone or in admixture with agents splitting off water, if desired while using carriers, as for example pumice stone. The temperature is usually selected between 100° and 300° C., although the process is not limited to these temperatures. Usually excellent yields are obtained when working between about 120° and about 150° C.

For example the aliphatic aldehyde and the secondary amine may be treated in about equimolecular porportions in the presence of an excess of hydrogen. Usually, however, it is advantageous to work with an excess of secondary amine and hydrogen. Especially favorable results are obtained generally speaking by using, for each molecular proportion of aldehyde, from about 1½ to 2½ molecular proportions of secondary amine and from 10 to 30 molecular proportions of hydrogen. The excess of secondary amine may be used again after separation from the reaction product, as for example by fractional distillation. By suitable selection of the initial materials it is possible to prepare tertiary amines having the same or different alkyl groups.

The process renders it possible to obtain the tertiary aliphatic amines in excellent yields even when working at atmospheric pressure and may therefore be carried out as a cyclic process.

The following examples will further illustrate the nature of this invention but the invention is not restricted to these examples. The parts are by weight.

Example 1

8 parts of acetaldehyde are vaporized per hour in 8 parts of flowing hydrogen and, separately therefrom, 28 parts of diethylamine are vaporized in 1 part of flowing hydrogen. The two currents of hydrogen are united in a chamber heated to 120° C. and then directly led at the same temperature over 100 parts of a nickel catalyst which has been activated by means of chromium oxide, reduced at elevated temperature in a current of hydrogen and applied to pieces of pumice stone. The reacted mixture is cooled first with water and then with solid carbon dioxide. The major portion of the unchanged diethylamine is distilled off from the united condensates and there remains a residue containing triethylamine, water formed during the reaction and some unchanged diethylamine. It is dried, for example with caustic potash, and fractionally distilled. The fraction passing over between 86° and 90° C. consists of practically pure triethylamine. The total yield of triethylamine amounts to 90 per cent of the theoretical yield calculated with reference to the acetaldehyde used.

Example 2

32 parts of dibutylamine and 8 parts of butyraldehyde per hour separately vaporized in 8 parts and 1 part of hydrogen, respectively, the two mixtures being led over a catalyst of the kind specified in Example 1 under the conditions specified therein. By cooling the reaction mixture with water and cooling brine, 40 parts per hour of condensate are obtained which consists to the extent of 34 per cent of tributylamine. The latter may be recovered therefrom in a good yield by fractional distillation.

Example 3

A mixture of 50 parts of vaporous dibutylamine, 8 parts of acetaldehyde and 9 parts of hydrogen is led per hour over 100 parts of the catalyst described in Example 1 at from 120° to 130° C. The reaction mixture is cooled with water and cooling brine and the combined condensates are then fractionally distilled. The fraction distilling over at above 165° C. after the water formed and the unchanged dibutylamine is subjected to repeated fractionation, ethyl-dibutylamine, boiling at from 172° to 175° C. being thus obtained in a good yield.

What I claim is:

1. The process of producing tertiary aliphatic amines, which comprises leading a vaporizable saturated aliphatic aldehyde having from 2 to 6 carbon atoms in the molecule with a secondary alkyl amine, each alkyl group of which contains at the most 6 carbon atoms, in the vapor phase with hydrogen at an elevated reaction temperature at which decomposition does not occur under about atmospheric pressure over a hydrogenation catalyst.

2. The process of producing tertiary aliphatic amines, which comprises leading 1 molecular proportion of a vaporizable saturated aliphatic aldehyde having from 2 to 6 carbon atoms in the molecule with from about 1.5 to 2.5 molecular proportions of a secondary alkyl amine, each alkyl group of which contains at the most 6 carbon atoms, in the vapor phase with from 10 to 30 molecular proportions of hydrogen at an elevated reaction temperature at which decomposition does not occur under about ordinary pressure over a hydrogenation catalyst.

3. The process of producing tertiary aliphatic amines, which comprises leading a vaporizable saturated aliphatic aldehyde having from 2 to 6 carbon atoms in the molecule with a secondary alkyl amine, each alkyl group of which contains at the most 6 carbon atoms, in the vapor phase with hydrogen at a temperature between about 100° and about 300° C. at about atmospheric pressure over a hydrogenation catalyst.

4. The process of producing tertiary aliphatic amines which comprises leading a vaporizable saturated aliphatic aldehyde having from 2 to 6 carbon atoms in the molecule with a secondary alkyl amine, each alkyl group of which contains at the most 6 carbon atoms, in the vapor phase with hydrogen at a temperature between about 120° and about 150° C. at about atmospheric pressure over a hydrogenation catalyst.

5. The process of producing tertiary aliphatic amines, which comprises leading a vaporizable saturated aliphatic aldehyde having from 2 to 6 carbon atoms in the molecule with a secondary alkyl amine, each alkyl group of which contains at the most 6 carbon atoms, in the vapor phase with hydrogen at a temperature between about 100° and about 300° C. at about atmospheric pressure over a nickel-hydrogenation catalyst.

6. The process of producing tertiary aliphatic amines, which comprises leading a vaporizable saturated aliphatic aldehyde having from 2 to 6 carbon atoms in the molecule with a secondary alkyl amine, each alkyl group of which contains at the most 6 carbon atoms, in the vapor phase with hydrogen at a temperature between about 100° and about 300° C. at about atmospheric pressure over a nickel-hydrogenation catalyst activated with chromium oxide.

7. The process of producing tertiary aliphatic amines which comprises leading a vaporizable saturated aliphatic aldehyde having from 2 to 6 carbon atoms in the molecule with a secondary alkyl amine, each alkyl group of which contains at the most 6 carbon atoms, in the vapor phase with hydrogen at a temperature between about 120° and about 150° C. over a nickel-hydrogenation catalyst activated with chromium oxide under about atmospheric pressure.

BRUNO CHRIST.